United States Patent [19]

Minoura et al.

[11] 4,251,126

[45] Feb. 17, 1981

[54] LIGHT BEAM SCANNING DEVICE WITH OPPOSED DEFLECTING SURFACES

[75] Inventors: Kazuo Minoura, Yokohama; Setsuo Minami, Kawasaki, both of Japan

[73] Assignee: Canon Kabushiki Kaisha, Tokyo, Japan

[21] Appl. No.: 45,843

[22] Filed: Jun. 5, 1979

[30] Foreign Application Priority Data

Jun. 6, 1978 [JP] Japan ................. 53/68056

[51] Int. Cl.³ ............................................. G02B 27/17
[52] U.S. Cl. ................................................... 350/6.6
[58] Field of Search ....................... 350/6.5–6.91; 250/235, 236; 358/206, 208; 355/66

[56] References Cited

U.S. PATENT DOCUMENTS

| 3,463,882 | 8/1969 | Herbold | 358/206 |
| 3,614,312 | 10/1971 | Fournier et al. | 358/208 |
| 4,008,958 | 2/1977 | Kingsland | 355/66 |

*Primary Examiner*—Jon W. Henry
*Attorney, Agent, or Firm*—Fitzpatrick, Cella, Harper & Scinto

[57] ABSTRACT

A light beam scanning device provided with a rotationally vibrating deflector having at least two deflective and reflective surfaces, a scanning surface subjected to scanning operation with light beam deflected by the deflector, an image-forming optical system interposed between the deflector and the scanning surface to focus the light beam from the deflector onto the scanning surface, and a light source section which emits light beam to the deflector, in which device a first deflected light beam plane to be formed by the deflected light beam immediately before entering the image-forming optical system at the forward movement of the deflector is made parallel with a second deflected light beam plane to be formed by the deflected light beam immediately before entering the image-forming optical system at the return movement of the deflector, and the deflecting direction of each beam to be deflected by the first deflected light beam plane and the second deflected light beam plane is made identical.

4 Claims, 10 Drawing Figures

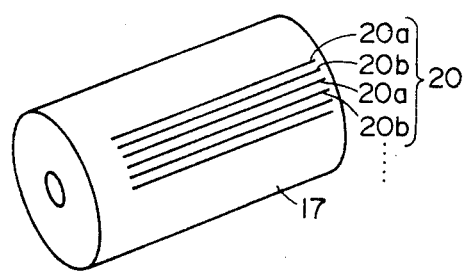
FIG. 7
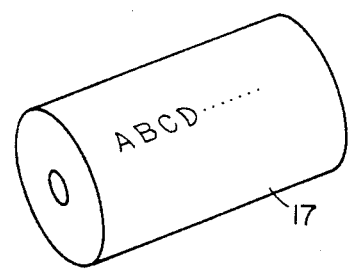
FIG. 8
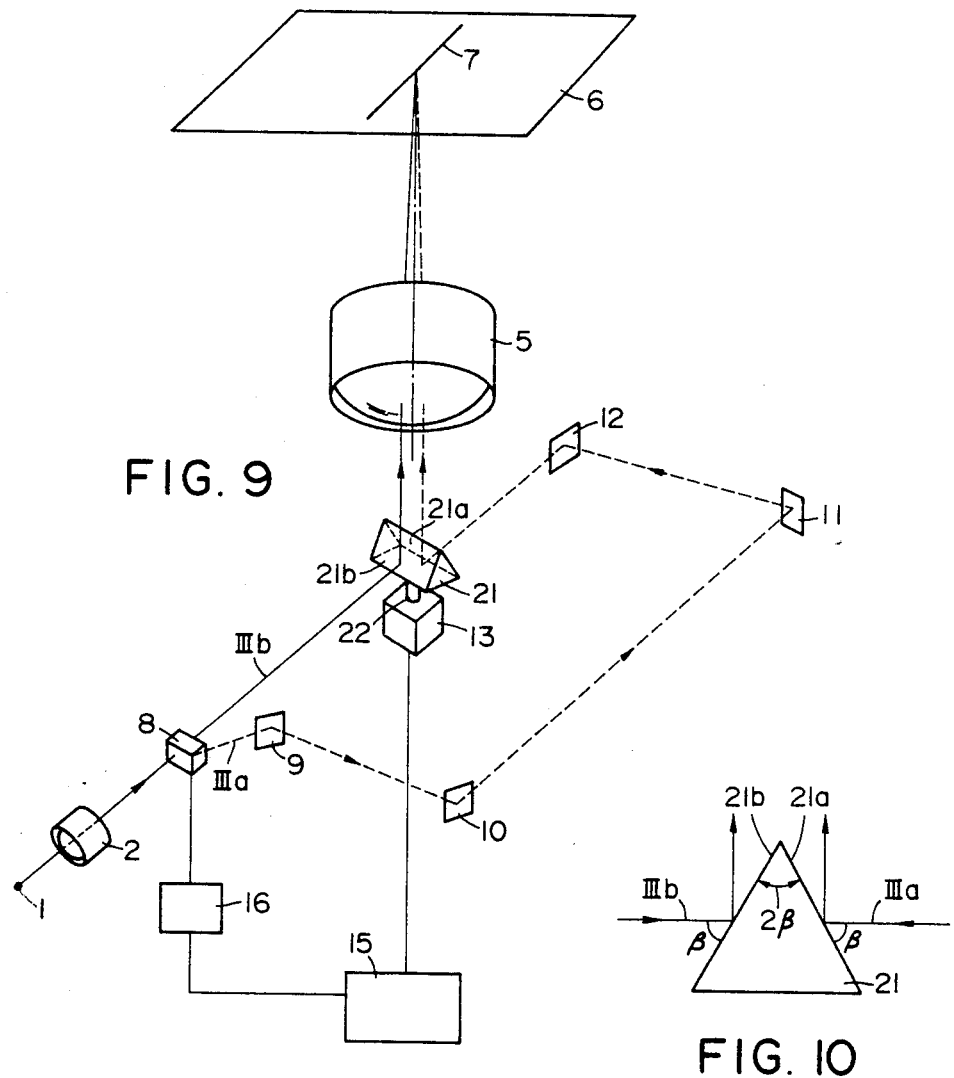
FIG. 9
FIG. 10

LIGHT BEAM SCANNING DEVICE WITH OPPOSED DEFLECTING SURFACES

BACKGROUND OF THE INVENTION

1. Field of the Invention

This invention relates to a light beam scanning device using a rotationally vibrating (hereinafter simply called "oscillating") deflector such as galvano-mirror.

2. Description of the Prior Art

For the representative types of the deflector which is generally used, there have so far been known a unidirectionally rotating deflector such as a rotary polygonal mirror and an oscillator deflector which swings back and forth like a galvano-mirror. While a relatively high scanning effect can be attained with the unidirectionally rotating deflector, the scanning operation is unavoidably interrupted in the oscillatory type deflector during return motion of the deflecting surface to is original position (this is called the backward or return rotation), because, with this type of deflector, only one direction of its rotation (this is called forward rotation) is usually employed. In this type of deflector, therefore, it is possible to improve its scanning effect by effectively utilizing not only its forward rotation, but also its backward rotation. On the basis of this concept, it has heretofore been known to effect the scanning operation in such a manner that, at both forward and return rotation of the deflector, a light beam is deflected by one and the same deflecting surface to make the deflecting direction of the light beam on the scanning surface to be mutually opposite between the forward and the backward rotations. However, since, in this scanning device, the scanning direction of the light beam on the scanning surface becomes opposite between the forward and the backward motion of the deflector, when this scanning device is utilized as a writing device, it becomes necessary to electrically reverse those informations to be written in for each line, which makes the device construction complicated. Further, in such device, when the scanning surface shifts at an equal speed, it is hardly possible to obtain scanning lines with equal space intervals.

SUMMARY OF THE INVENTION

It is therefore the primary object of the present invention to provide an improved light beam scanning device free from the aforementioned defects.

It is another object of the present invention to provide a light beam scanning device capable of always obtaining the scanning lines of a definite direction on the scanning surface, even when the forward and the backward motions of the oscillatory type deflector are utilized for the scanning operation.

It is still another object of the present invention to provide the light beam scanning device of a simple construction.

It is another object of the present invention to provide the light beam scanning device capable of always attaining the scanning operation at a constant speed on the scanning surface, even when the deflector performs unequal angular speed rotation.

The abovementioned objects of the present invention can be achieved by the light beam scanning device which comprises a rotationally vibrating deflector, a scanning surface to be scanned by a light beam deflected by the deflector, an image-forming optical system interposed between the deflector and the scanning surface to focus the light beam from the deflector onto the scanning surface, and a light source section which emits light beam to the deflector, in which device a first deflected light beam plane to be formed by the deflected light beam immediately before entering the image-forming optical system at the forward movement of the deflector is made parallel with a second deflected light beam plane to be formed by the deflected light beam immediately before entering the image-forming optical system at the return movement of the deflector, and the deflecting direction of each beam to be deflected by the first deflected light beam plane and the second deflected light beam plane is made identical.

In the light beam scanning device according to the present invention, either the same or a different deflecting surface of the deflector may be used at the time of forward and return motion thereof. When one and the same deflecting surface is used, an image reversing device such as an image rotator is placed between the deflector and the image-forming optical system at either forward or backward rotation to reverse the light beam deflecting direction so that the unidirectional scanning operation can be attained on the scanning surface. The abovementioned image rotator may be dispensed with by the use of a different deflecting surface in each of the forward and backward motion of the deflector. In more detail, when the reflecting surface of the deflector is in parallel with its rotational axis, the light beam scanning device is so constructed that the first deflected light beam plane to be formed with lapse of time by the light beam immediately after it is deflected by the first deflecting surface of the deflector at its forward motion and the second deflected light beam plane to be formed with lapse of time by the light beam immediately after it is deflected by the second deflecting surface different from the first deflecting surface at the backward motion of the deflector may be placed at symmetrical positions with respect to the rotational axis (oscillatory axis) of the deflector, whereby the image rotator can be dispensed with. In order to construct the device as such, an angle to be formed by the light beam incident on the first deflecting surface and the light beam incident on the second deflecting surface is set approximately $\pi - 2\alpha$, provided that an angel formed by the first and second deflecting surfaces is $\alpha$.

Also, considering a case of the so-called "roof mirror" construction, wherein the reflecting surface of the deflector is not in parallel with its rotational axis, i.e., in case the deflector is formed of two deflecting surfaces, an angle which the light beams impinging onto the first and second deflecting surfaces forms with each of these deflecting surfaces within a plane including the rotational axis of the deflector is mutually equal, and the angle is set $\alpha$, the light beam plane to be formed by the light beam immediately after it is deflected by the first deflecting surface and the light beam plane to be formed by the light beam immediately after it is deflected by the second deflecting surface can be made parallel to each other by setting the angle formed by the first and second deflecting surfaces to be $2\beta$. Accordingly, when such roof mirror deflector is used, the light beam reflected by the deflector can be directly led to the image-forming optical system, as compared with the deflector having its deflecting surfaces provided in parallel with its rotational axis.

A preferred embodiment of the light beam scanning device of the present invention to be described later comprises a deflector having at least two deflecting and reflecting surfaces and rotationally vibrating with equal rotational characteristic at its forward and return motions, an image-forming optical system for scanning which is interposed between the deflector and a scanning surface, a light source section which projects a light beam onto the first deflecting surface of the deflector at its forward motion and projects a light beam onto the second deflecting surface thereof at its return motion, and a transmitting optical system to lead the first deflected light beam deflected by the first deflecting surface and the second deflected light beam deflected by the second deflecting surface. In such device, the first deflected light beam plane to be formed with time lapse by the light beam immediately after it is deflected by the first deflecting surface and the second deflected light beam plane to be formed with time lapse by the light beam immediately after it is deflected by the second deflecting surface are placed at substantially symmetrical positions with respect to the rotational axis of the deflector.

Another preferred embodiment of the light beam scanning device to be described later comprises a deflector having at least two deflecting and reflecting surfaces and rotationally vibrating with equal rotational characteristics at its forward and return motions, an image-forming optical system for scanning which is interposed between the deflector and a scanning surface, and a light source section which projects a light beam onto the first deflecting surface of the deflector at its forward motion and projects a light beam onto the second deflecting surface thereof at its return motion. In this device, the deflecting surface of the deflector is inclined with respect to its rotational axis, and the light beam deflected plane to be formed by the light beam immediately after it is deflected by the first deflecting surface and the light beam deflected plane to be formed by the light beam immediately after it is deflected by the second deflecting surface are made mutually parallel, in which state the light beam is projected into the image-forming optical system. It is desirable in the light beam scanning device according to the present invention that the light beam to be projected onto the deflecting surface be projected in parallel with the plane which the normal line of the deflecting surface forms in accordance with the deflection. Although the light beam to be projected into the image-forming optical system should be a parallel beam, it is not necessary that the high beam is made parallel at the time of its incidence into the deflector, but it is sufficient that the light beam is brought to the parallel state at the time of its incidence into the image-forming optical system.

In the following, the present invention will be described in more detail in reference to the accompanying drawing.

BRIEF DESCRIPTION OF THE DRAWING

FIG. 7 is a schematic perspective view showing scanning lines of the light beam to scan the recording surface shown in FIG. 6;

FIG. 8 is a schematic perspective view showing one example of images recorded on the recording surface;

FIG. 9 is still another embodiment of the light beam scanning device according to the present invention; and FIG. 10 is a side elevational view of the deflector shown in FIG. 9.

DESCRIPTION OF PREFERRED EMBODIMENTS

Figure 1:
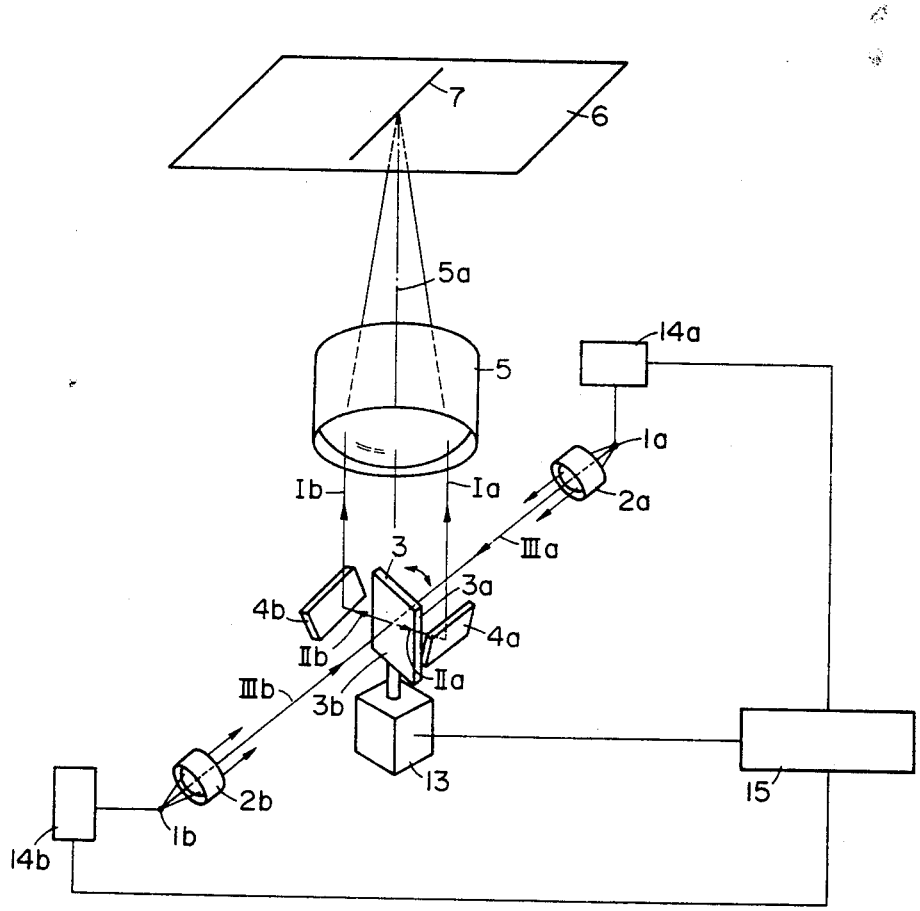
FIG. 1 is a schematic perspective view illustrating one embodiment of the light beam scanning device according to the present invention.

FIGS. 1 to 4 explain the principle of the light beam scanning device according to the present invention, in which FIG. 1 is a perspective view showing one embodiment of the light beam scanning device of the present invention. In the drawing, a rotationally vibrating deflecting mirror 3 fixedly mounted on a driving system 13 has two deflecting and reflecting surfaces 3a, 3b. A light source 1a is provided for the deflecting and reflecting surface 3a, while another light source 1b is provided for the deflecting and reflecting surface 3b. Light beams emitted from the respective light sources 1a, 1b are collected by collimator lenses 2a, 2b, after which they are reflected by the deflecting and reflecting surfaces 3a, 3b in mutually opposite directions. The light beam reflected by the deflecting and reflecting surface 3a is subjected to change in the direction of its light path, while the light beam reflected by the deflecting and reflecting surface 3b is subjected to change in the direction of its light path. Thereafter, both light beams are impinged on an image-forming lens system 5 for scanning. When a light beam which has been deflected by the fixed mirror 4a and which is immediately before its incidence into the image-forming optical system 5 is designated by Ia, and a light beam which has been deflected by the fixed mirror 4b and which is immediately before its incidence into the image-forming lens system 5 is designated by Ib, each of the light beams is introduced in such a manner that the light beam plane which the light beam Ia forms with rotation of the deflector 3 and the light beam plane which the light beam Ib forms with rotation of the deflector 3 may be mutually parallel. These light beams Ia, Ib are converged by the image-forming lens system 5 for scanning and focussed on a scanning surface 6 which is so disposed as to coincide with the image-forming plane of one of the lens system 5. Accordingly, when the deflecting mirror 3 is oscillated by the driving system 13, the light beam for the light sources 1a, 1b scan one and same line 7 on the scanning surface.

In the light beam scanning device shown in FIG. 1, each of the deflecting and reflecting surfaces 3a, 3b is selectively utilized by rotational direction of the deflecting mirror. In other words, as the deflector oscillates, the deflecting and reflecting surfaces thereof are alternately utilized, and, as mentioned above, when the deflector 3 is at one and same rotational position, the light beams reflected by the deflecting and reflecting surfaces 3a and 3b assume substantially 180° of an angle, whereby it becomes possible to scan the light beams in one and the same direction on the scanning surface 6 by the use of a stationary optical system alone.

Figure 2:
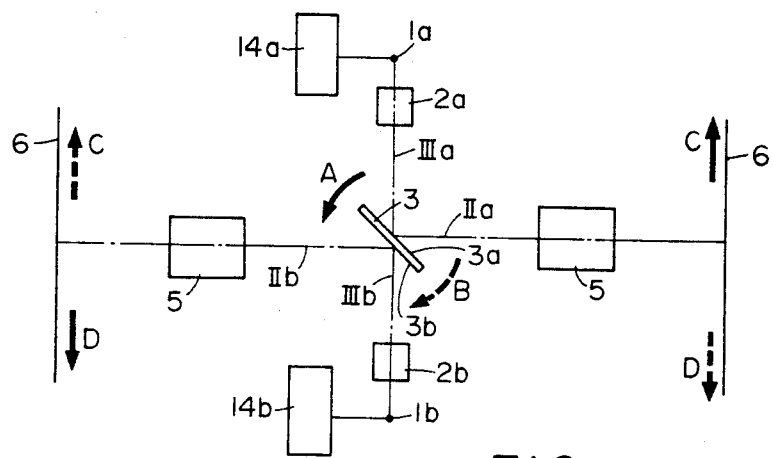
FIG. 2 is a developed diagram of an optical system having an equivalent relationship with the optical system of the device shown in FIG. 1.

FIG. 2 illustrates the abovementioned situation, which is a developed diagram in equivalent relationship with the optical system shown in FIG. 1. As shown in FIG. 2, when the deflecting mirror 3 rotates in the arrowed direction A, the light beam from the light source 1a is scanned in the arrowed direction C on the scanning surface 6. Similarly, at that time, the light beam from the light source 1b is scanned in the arrowed direction D, which is opposite to the direction C, on the scanning surface 6. Subsequently, when the deflecting mirror 3 rotates in the arrowed direction B opposite to the direction A, the light beam from the light source 1a is scanned in the arrowed direction D on the scanning surface 6. At this time, the light beam from the light source 1b is scanned in the direction C, opposite to the direction D, on the scanning surface 6. Accordingly, when the deflecting mirror 3 rotates in the direction A, only the light beam from the light source 1a is used, and, when the deflecting mirror rotates in the direction B, only the light beam from the light source 1b is used, there can always be attained the scanning in the direction C. In the same manner, if the light beam from the light source 1b alone is used when the deflecting mirror rotates in the arrowed direction A, and if the light beam from the light source 1a alone is used when the deflecting mirror rotates in the arrowed direction B, there can always be attained the scanning in the direction D on the scanning surface 6. Further, as shown in FIG. 2, when the light beams from the light sources 1a, 1b immediately after their reflection by the deflecting and reflecting surfaces 3a, 3b are designated by IIa and IIb, respectively, and the optical system is so set that the light beams IIa and IIb may become symmetrical with respect to the rotational axis of the deflecting mirror, i.e., they may form substantially 180° of an angle, the transmitting optical system between the deflecting mirror 3 and the image-forming lens system 5 can be constructed with the stationary optical system.

In this light beam scanning device, the light sources 1a, 1b are subjected to modulation by electrical signal modulating systems 14a, 14b, respectively. When the deflecting mirror 3 rotates in the direction A, the light source 1a is turned on by the modulating system 14a and the light source 1b is turned off by the modulating system 14b. Conversely, when the deflecting mirror 3 rotates in the direction B, the light source 1a is turned off by the modulating system 14a and the light source 1b is turned on by the modulating system 14b. Thus, when the light sources 1a, 1b are controlled by a timing regulating system 15 which generates instruction signals to the modulating systems 14a, 14b so as to turn on and off the light sources 1a, 1b it becomes always possible to obtain the scanning lines in one and the same direction on the scanning surface 6.

As stated in the foregoing, in order that the light beam which has been deflected by the first deflecting surface and the light beam which has been deflected by the second deflecting surface may take a substantially 180° of an angle between them, when the deflector to deflect light beams by alternate use of its two deflecting surfaces is at a certain deflecting position, the following conditions should generally be satisfied.

Figure 3:
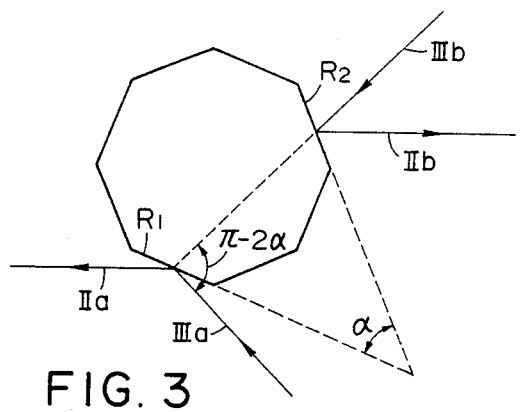
FIG. 3 is a diagram showing a relationship between the deflecting surface and an incident light beam in the present invention.

As shown in FIG. 3, when the deflector consists of n numbers of reflecting surfaces, of which the first reflecting surface $R_1$ and the second reflecting surface $R_2$ are used, if an angle formed by the first reflecting surface $R_1$ and the second reflecting surface $R_2$ is designated by $\alpha$, the angle to be formed by the light beam IIIa incident on the first reflecting surface and the light beam IIIb incident on the second reflecting surface should be $\pi - 2\alpha$.

Setting of the optical system as such is particularly effective to the unequal angular oscillation, wherein the oscillating characteristic of the deflector to be generally used for the oscillatory type deflecting mirror is directed to high speed operation. The reason for this is that, in the case of the unequal angular oscillating motion, a graph showing the oscillating characteristic of the deflector is usually symmetrical with at least one point as the center of symmetry. Accordingly, the optical system is generally installed in such a manner that the light beam which has been reflected at this point of symmetry (the position of the deflector as this point will hereinafter be termed "reference oscillatory position") may project in parallel with the optical axis of the image-forming lens system for scanning. When the equal speed scanning is to be done on the scanning surface using the optical system of the present invention which has been set in the above-described manner, the scanning lens should be given a distortional characteristic in accordance with the oscillating characteristic of the deflector. Here, explanations will be given as to the deflector performing sinusoidal vibrations, as an example. When a condition is set for the sinusoidally vibrating deflector such that the equal speed scanning is effected on the scanning surface 6, the scanning lens 5 should possess a distortional characteristic, by which the scanning position y' is represented by the following equation.

$$y' = 2\phi_o f \sin^{-1}\left(\frac{\theta}{2\phi_o}\right) \quad (1)$$

In the above equation (1), f denotes a focal length of the scanning lens 5; $\theta$ is a deflection angle after the incident light beam has been reflected by the deflecting mirror 3 (an angle formed by the optical axis of the scanning lens 5 and the deflected beam); and $\phi_o$ is an amplitude of the deflecting mirror 3 performing the sinusoidal vibrations to be represented by the following equation.

$$\phi = \phi_o \sin k t \quad (k: \text{constant}) \quad (2)$$

In the above equation (2), t denotes a time, and when $t = (m\pi)/k$ (m: integor), i.e., when the deflector is at the reference oscillatory position, the deflected beam is in parallel with the optical axis of the scanning lens, and the scanning position y' in the above equation (1) corresponds to a distance from the optical axis to the scanning point on the scanning surface 6.

The deflection angle $\theta$ is represented as $\theta = 2\phi = 2\phi_o \sin k t$. When this placed in the equation (1), the scanning position y' is written as follows, and y' is proportionate to them. In other words, equal speed scanning is done.

$$y' = 2k\phi_o f t \quad (3)$$

Figure 4:
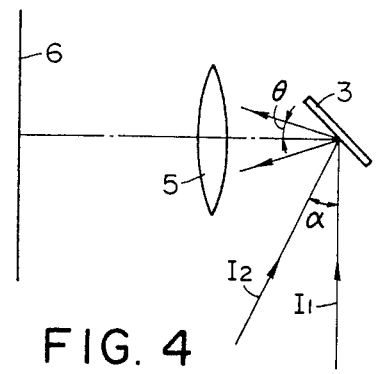
FIG. 4 is also a diagram explaining a relationship between unequal angular oscillation of the deflector and scanning speed of the scanning surface in the present invention.

In FIG. 4, if it assumed that the incident beam $I_1$ is such one that is projected into the image forming optical system in parallel with the optical axis thereof after it is reflected by the deflecting surface at the reference oscillatory position, the scanning position $y'_1$ on the scanning surface 6 is represented as follows.

$$y_1' = 2\phi_o f \sin^{-1}\left(\frac{\theta}{2\phi_o}\right) \quad (4)$$

On the other hand, if it is assumed that the incident beam $I_2$ is one that is projected into the image-forming optical system forming an angle $\alpha$ with the abovementioned incident beam $I_1$ relative to the deflecting surface which is at the reference oscillatory position, the scanning position $y'_2$ on the scanning surface 6 is represented as follows.

$$y_2' = 2\phi_o f \sin^{-1}\left(\frac{\theta + \alpha}{2\phi_o}\right) \quad (5)$$

The scanning speed on the scanning surface 6 with respect to the incident beam $I_1$ can be represented as follows, in the same manner as the equation (3) was found.

$$y'_1 = 2k\phi_o f t$$

From the above equation, the scanning operation is done at an equal speed. On the other hand, the scanning speed with respect to the incident beam $I_2$ on the scanning surface 6 is represented as follows by time-differentiation of the equation (5), which signifies that the scanning speed is not equal.

$$\frac{dy'}{dt} = \frac{2k\phi_o \cos kt}{\sqrt{\cos^2 kt - 2\alpha \sin kt - \left(\frac{\alpha}{2\phi_o}\right)^2}} \quad (6)$$

The above phenomenon will be further explained in detail in reference to FIG. 2. Assuming that a scanning position on the scanning surface 6 corresponding to the light beam from the light source $1a$ is $y'a$ and that another scanning position corresponding to the light source from the light source $1b$ is $y'b$, a time, at which the modulating signal begins to be imparted to the light source $1b$, retards by $\Delta\tau$ from a time, at which the modulating signal begins to be applied to the light source $1a$. As the consequence, the deflecting angles $\theta a$ and $\theta b$ of, the deflected light beams corresponding to the respective light sources can be represented as follows.

$$\theta a = 2\phi_o \sin kt \quad (7)$$

$$\theta b = 2\phi_o \sin\{k(t + \Delta\tau)\} \quad (8)$$

In the above equation (8), $\Delta\tau$ can be readily known from the afore-described timing regulating method to be as follows.

$$\Delta\tau = \pi/k \quad (9)$$

Therefore, this is substituted in the equation (8) to obtain the following equation (10), from which the deflecting angle $\theta b$ corresponding to the light source $1b$ becomes equal to the deflecting angle corresponding to the light source $1a$.

$$\theta b = 2\phi_o \sin(kt + \pi) = 2\phi_o \sin kt = \theta a \quad (10)$$

In other words, the behavior of the deflected beam corresponding to the light source $1b$ shifts by a time $\Delta\tau = \pi/k$ with respect to the behavior of the deflected light beam corresponding to the light source $1a$, and it has the same deflecting characteristic. Accordingly, the light beam corresponding to the light source $1b$ scans the same position with only delay by $\Delta\tau = \pi/k$ from a certain time period, during which the light beam corresponding to the light source $1a$ has performed the scanning. It is apparent from the above that the scanning speed is $2k\phi_o f$ (=cont).

The preferred embodiment of the scanning device shown in FIG. 1 uses two light sources. In the following, another embodiment of the present invention, in which the light beam scanning device has a single light source, will be explained in reference to FIG. 5.

In the drawing, a light beam from the light source 1 passes through a collimator lens 2, and enters into an acousto-optical element 8 (hereinafter abbreviated as "AO element"). A reference numeral 16 designates a control circuit for controlling the number of vibration of a piezo element in the AO element 8. With a signal from this control circuit 16, therefore, the light beam to be diffracted by the AO element changes its angle. The signal from the control circuit 16 is controlled by a signal from the abovementioned timing regulating system 15. Accordingly, by application of two kinds of signals to the AO element 8, the light beam emitting from the AO element can be taken out as a light beam having two arbitray different directions. And, the light beam IIb in one direction is directly led to the deflecting and reflecting surface 3b, while the light beam IIa in another direction is led to the deflecting and reflecting surface 3a through reflecting mirrors 9, 10 11 and 12 in the such a manner that it may form an angle of substantially 180° with respect to the light beam IIb. Incidentally, the other constituent members and construction of the device shown in FIG. 5 are identical with those of the device shown in FIG. 1.

Figure 5:
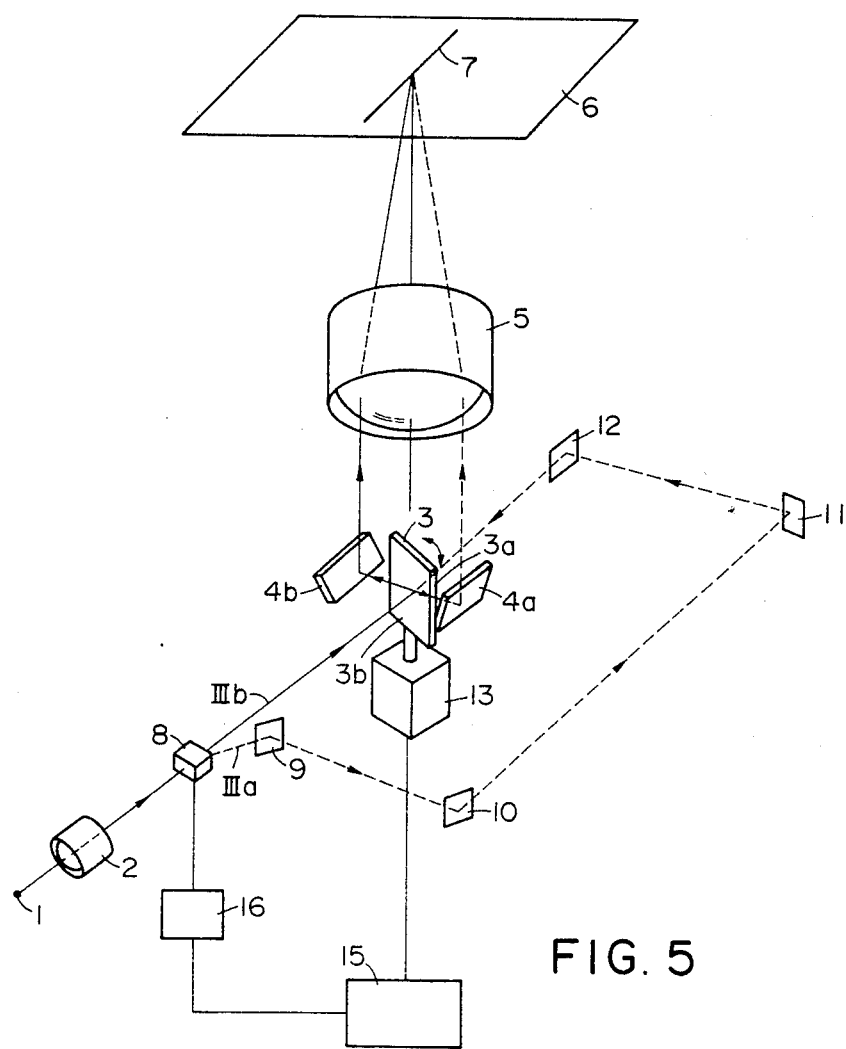
FIG. 5 is a schematic perspective view illustrating another embodiment of the light beam scanning device according to the present invention.
Figure 6:
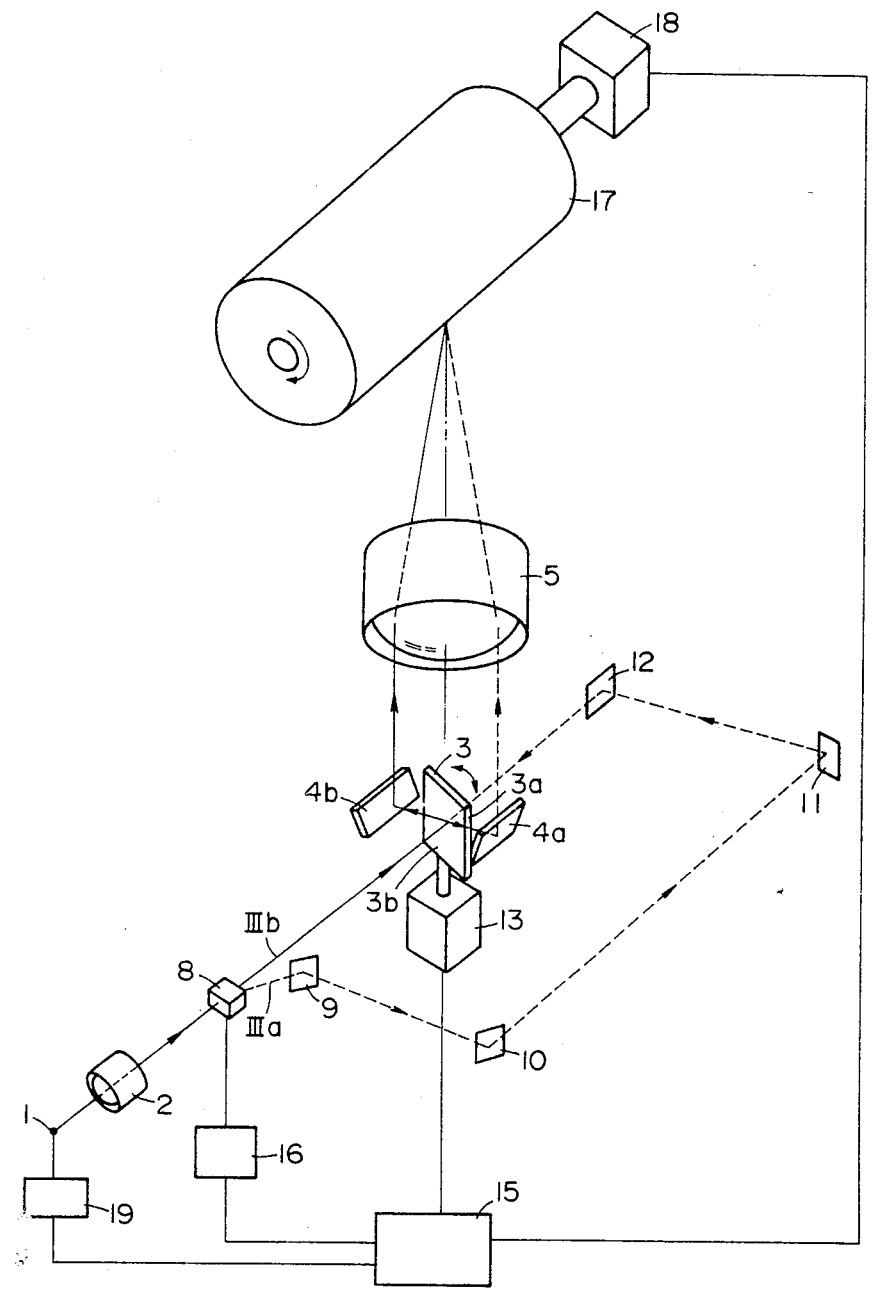
FIG. 6 is also a schematic perspective view illustrating the light beam scanning device shown in FIG. 5 when it is used in an information recording device.

FIG. 6 illustrates one embodiment of an information recording device, wherein the light beam scanning device shown in FIG. 5 is used as a write-in device. In the drawing, the recording device is so constructed that a photosensitive medium 17 is placed on a cylinder having a generatrix which is parallel with the scan line 7 in FIG. 5 and the scanning operation is performed over this photosensitive medium 17. The cylinder is rotatable around a shaft which is parallel with the generatrix thereon, and the rotation of this cylinder is effected by a driving system 18. A driving system 13 for the deflecting mirror 3, a control system 16 for the AO element 8, and a driving system 18 for the cylinder, on which the photosensitive medium 17 is placed, are so controlled by the timing regulating system 15 that they may operate synchronously. Further, a modulating system 19 is connected to the timing regulating system 15 so that it may operate to impart a recording signal to the light source 1 in synchronism with the operations of the systems 13, 16 and 18.

Since the timing regulating methods of the control system 16 for the AO element 8 and the driving system 13 for the deflecting mirror 3 are the same as mentioned in foregoing, no explanations will be repeated herein. In the following, detailed description will be given as to driving of the driving system 18 for the cylinder with the photosensitive medium 17 mounted thereon and a method of operating the modulating system 19 to impart a recording signal to the light source.

The cylinder, on which the photosensitive medium 17 is mounted, is driven by the driving system 18 so that it may be rotated at an equiangular speed. As the result, there can be obtained on the photosensitive medium 17 a plurality of scanning lines 20 with equal space intervals among them as shown in FIG. 7. In FIG. 7, reference numerals 20a designate the scan lines due to the light beam reflected by the deflecting and reflecting surface 3a, and numerals 20b refer to the scan lines due to the light beam reflected by the deflecting and reflecting surface 3b. These scan lines 20a and 20b are arranged alternately on the photosensitive medium 17. Such arrangement of the scan lines takes place when the modulating system 19 to impart a signal to the light source 1 is in "on" state. Therefore, when the modulating system 19 which gives the light source "on" and "off" signals is turned on and off in accordance with a time-sequential signal which is desired to be recorded, a desired image is recorded on the photosensitive medium 17, as shown in FIG. 8. For the expedient to turn "on" and "off" the light beam arriving at the recording surface with a light beam from the light source, there are two methods: the one is to directly control the light source as shown in FIG. 1 or 6; and the other is to provide the modulating system such as the AO element, etc. between the light source and the deflector, while a light beam is being constantly emitted from the light source. A suitable light source for the former method is a semiconductor laser, and, for the latter, and ordinary laser of a continuous oscillation type is proper. For the beam modulating means, an electro-optical element (EO element) may be used besides the AO element.

FIG. 9 shows still another embodiment of the light beam scanning device according to the present invention. The device is exactly the same as that shown in FIG. 5, except for the shape of the deflector 21 being different. The deflector 21, as its side elevational view is shown in FIG. 10, is a roof mirror consisting of two deflecting and reflecting surfaces 21a, and 21b. In this type of deflector, when the light beams IIa, IIb impinge on the deflecting and reflecting surfaces 21a, 21b of the deflector 21, if the angle formed by the light beam and the deflecting and reflecting surface within a plane including the rotational axis of the deflector 21 is assumed to be $\beta$, the angle formed by the first deflecting surface 21a and the second deflecting surface 21b is $2\beta$. By taking such angle, each of the deflected light beam planes to be formed with time lapse by the light beam IIa and IIb immediately after they are deflected with rotation of the deflector become parallel each other. Therefore, these beams IIa and IIb can be directly led to the image-forming lens system 5. Incidentally, in the above-mentioned deflector, if $\beta=45°$, a favorable deflecting and scanning operation can be easily attained.

As stated in the foregoing, the light beam scanning device according to the present invention is capable of attaining unidirectional scanning on the scanning surface with a simple device construction by effectively utilizing different deflecting and reflecting surfaces of the rotationally vibrating deflector at its forward and backward motions, whereby excellent effect can be realized along with improvement in the scanning efficiency.

What we claim is:

1. A light beam scanning device comprising:
(a) a rotationally vibrating deflector having at least two deflecting and reflecting surfaces, and the first deflected light beam plane to be formed with lapse of time by the light beam immediately after it is deflected by the first deflecting and reflecting surface of said deflector at its forward motion and the second deflected light beam plane to be formed with lapse of time by the light beam immediately after it is deflected by the second deflecting and reflecting surface different from the first deflecting and reflecting surface at the backward motion of said deflector being placed at substantially symmetrical positions wiht respect to the rotational axis of said deflector;
(b) a scanning surface to be scanned by the light beam deflected by said deflector;
(c) an image-forming optical system interposed between said deflector and said scanning surface to focus the light beam from said deflector on said scanning surface;
(d) first optical means which causes the light beam deflected by the deflecting and reflecting surfaces of said deflector to enter said image-forming optical system at the time of forward motion of said deflector; and
(e) second optical means which leads the light beam deflected by said deflector, at the time of backward motion of said deflector which oscillates in the direction opposite to that at the time of its forward motion, within a plane parallel with a deflected light beam plane formed with lapse of time by the light beam entering the image-forming optical system through said first optical means at the time of its incidence.

2. A light beam scanning device comprising:
(a) a rotationally vibrating deflector having two deflecting and reflecting surfaces disposed in parallel with respect to the rotational axis thereof, and the first deflected light beam plane to be formed with lapse of time by the light beam immediately after it is deflected by the first deflecting and reflecting surface of said deflector at its forward rotation and the second deflected light beam plane to be formed with lapse of time by the light beam immediately after it is deflected by the second deflecting and reflecting surface defferent from the first deflecting and reflecting surface at the backward rotation of said deflector being placed at substantially symmetrical positions with respect to the rotational axis of said deflector;
(b) a light source section which causes a light beam to enter the first deflecting and reflecting surface of said deflector at the time of its forward rotation, and which causes the light beam to enter the second deflecting and reflecting surface of said deflector at the time of its backward rotation in the direction opposite to that at its forward rotation;
(c) a scanning surface to be scanned by the light beam deflected by said deflector;
(d) an image-forming optical system interposed between said deflector and said scanning surface to focus the light beam from said deflector onto said scanning surface;
(e) first optical member interposed between said deflector and said image-forming optical system to lead the light beam deflected by the first deflecting and reflecting surface of said deflector into said image-forming optical system; and
(f) a second optical member which leads the light beam deflected by said second deflecting and reflecting surface into the image-forming optical system within a plane parallel with a deflected light beam plane formed with lapse of time by the incidence light beam when it enters the optical systems through said first optical member, and in the same direction as the light beam is deflected at the deflected light beam plane.

3. The light beam scanning device as claimed in claim 2, wherein said light source section comprises a single light source, light transmission means having a first transmission light path to lead the light beam to said first deflecting and reflecting surface and a second transmission light path to lead the light beam to said second deflecting and reflecting surface, and light path selecting means interposed between said light source and said light transmission means to transmit the light beam by selection of either said first transmission light path or said second transmission light path.

4. The light beam scanning device as claimed in claim 3, wherein said light path selecting means is an acousto-optical element.

* * * * *